US006842604B1

United States Patent
Cook et al.

(10) Patent No.: US 6,842,604 B1
(45) Date of Patent: *Jan. 11, 2005

(54) PERSONAL DIGITAL CONTENT SYSTEM

(75) Inventors: David Cook, Seattle, WA (US); Terry D. Hester, Houston, TX (US)

(73) Assignee: Loudeye Corporation, Seattle, WA (US)

( * ) Notice: Subject to any disclaimer, the term of this patent is extended or adjusted under 35 U.S.C. 154(b) by 337 days.

This patent is subject to a terminal disclaimer.

(21) Appl. No.: 09/976,507

(22) Filed: Oct. 12, 2001

Related U.S. Application Data

(62) Division of application No. 09/270,817, filed on Mar. 17, 1999, now Pat. No. 6,338,044.

(51) Int. Cl.[7] ............................. H04H 1/00; H04H 7/00; G06F 17/60
(52) U.S. Cl. ..................... 455/3.06; 455/3.01; 455/3.05; 705/14; 705/26; 705/54
(58) Field of Search .................... 455/45, 3.01, 3.05, 455/3.06, 725, 86, 87, 186.01; 705/14, 26, 54

(56) References Cited

U.S. PATENT DOCUMENTS 5,577,266 A * 11/1996 Takahisa et al. ........... 455/3.06
5,819,160 A * 10/1998 Foladare et al. ............. 455/45
6,338,044 B1 * 1/2002 Cook et al. .................. 705/14

OTHER PUBLICATIONS

Noree et al, Interactive System and Method for Use with Broadcast Media, US2002/0183059.*
Fleenor, User Customized Radio, US2002/0002032.*

* cited by examiner

Primary Examiner—Lester G. Kincaid
Assistant Examiner—Yuwen Pan
(74) Attorney, Agent, or Firm—Shaw Pittman LLP

(57) ABSTRACT

An Internet-enabled means of distributing entertainment programming with embedded advertising in which the entertainment programming is customized according to consumers' stated preferences and the advertising is customized according to consumer demographics and also according to consumers' stated preferences. A computing system usable to create and distribute personalized entertainment and advertising content comprising computer hosts having software agents acting to administer a master digital library as well as end users' digital libraries, establish advertising bookings and insert advertising content, establish schedules of digital content for distribution to end users, identify digital content listed on a schedule but missing from the end user's digital library, distribute across a communications network digital content to end users, and decrypt and play or display the digital entertainment and advertising content. A communications network for exchanging information and data among said computer hosts and agents.

1 Claim, 9 Drawing Sheets

EXAMPLE RECORD STRUCTURE OF MASTER DIGITAL LIBRARY AND END USER DIGITAL LIBRARY

6 ⟶ ARTIST'S NAME

8 ⟶ TRACK TITLE

10 ⟶ ALBUM TITLE

12 ⟶ GENRE

14 ⟶ TRACK LENGTH

16 ⟶ FILE FORMAT

18 ⟶ BIT RATE

20 ⟶ FADE-IN POINT ("INTRO")

22 ⟶ FADE-OUT POINT ("OUTRO")

24 ⟶ TRACK IDENTIFICATION CODE

26 ⟶ TRACK LOCATION

28 ⟶ ENCRYPTION KEY

30 ⟶ URL

FIGURE 2

EXAMPLE SCHEDULE

40 ⟶ RECORDED ANNOUNCMENT #973

102 ⟶ TRACK #127

36 ⟶ AD #035

38 ⟶ LOCAL INSERT BREAK #048

104 ⟶ TRACK #583

106 ⟶ TRACK #427

108 ⟶ TRACK #727

37 ⟶ AD #350

110 ⟶ TRACK #625

112 ⟶ TRACK #236

39 ⟶ AD #443

42 ⟶ EXTERNAL EVENT #897

FIGURE 3

PERSONAL DIGITAL CONTENT SYSTEM

This application is a division of 09/270,817 filed Mar. 17, 1999, now U.S. Pat. No. 6,338,044.

BACKGROUND OF THE INVENTION

The present invention pertains to a means for distributing digital entertainment and advertising programming across a communications network in which the entertainment programming is customized according to consumers' stated preferences and the advertising is customized both according to consumer demographics and also according to consumers' stated preferences.

As computers become more powerful, consumers have begun using them for entertainment, listening to music and watching multimedia presentations and videos. The Internet has become the world's largest communications network and has become the most powerful information distribution method known to man. Because audio and video can be digitized, they can be stored in electronic form and distributed over the Internet.

Computing power and storage has dramatically increased the number of people who are taking advantage of the personal computer and the Internet as sources of information generally and entertainment in particular. Dramatic expansions of available bandwidth have made it faster and therefore more convenient for consumers to use the Internet and personal computer as entertainment media. Most of the music available on the Internet is in a format known as MPEG One Layer 3 and MPEG 2 Layer 3. These formats compress the size of the audio file so that it is possible to distribute them quickly over the Internet and store large volumes of music on a personal computer or a portable play-out device.

The increased popularity of the Internet as a medium of entertainment creates challenges for the entire entertainment industry. The industry is challenged to insure that entertainment content distributed through the Internet is legally authorized for duplication and distribution. It is a challenge to account for the exact frequency and quantity of authorized distribution and performance of entertainment content. There is a strong need within the industry to establish a sound and reliable economic model or framework to support the coming inevitable and massive distribution of entertainment through the Internet. There is a strong challenge to structure advertising content for meaningful groups of consumers when the principal distribution medium, the Internet, is inherently global in operation. Advertisers are severely in need of means to advertise products in ways that are meaningful but different, that is, specifically tailored, for residents of Houston as well as residents of London or Hong Kong.

Related art includes U.S. Pat. No. 5,793,964 (Rogers et al., U.S. Pat. No. 5,790,789 (Suarez), U.S. Pat. No. 5,694,334 (Donahue et al.), U.S. Pat. No. 5,761,428 (Sidey), U.S. Pat. No. 5,655,081 (Bonnell et al., U.S. Pat. No. 5,367,635 (Bauer et al.,), U.S. Pat. No. 5,774,660 (Brendel et al.), U.S. Pat. No. 5,774,656 (Hattori et al.), U.S. Pat. No. 5,768,506 (Randell), none of which teaches the present invention's secure and accountable distribution of entertainment content with embedded advertising scheduled according to consumers' demographics and stated preferences.

SUMMARY OF THE INVENTION

The present invention pertains to a means for distributing digital entertainment and advertising programming across a communications network in which the entertainment programming is customized according to consumers' stated preferences and the advertising is customized both according to consumer demographics and also according to consumers' stated preferences. The invention can encrypt digital entertainment content so that the content is assured to be copied, distributed, and performed only as authorized. The invention can account for the frequency and quantity of distribution and performance of entertainment content. The invention implements a sound economic model for distribution of entertainment through the Internet. The invention enables advertisers to direct advertising content with precision to meaningful groupings of consumers.

More specifically, the invention pertains to a computing system usable to create a personal digital content system. The computer system comprises a number of computer hosts with many computer hosts implementing end users' digital libraries, at least one computer host acting to schedule and distribute digital content, and at least one computer host acting as a master digital library containing material to be used in the personal digital content system. The invention further pertains to a communications network for exchanging information among computer hosts. The invention includes many software agents executing on computer hosts. The agents are configured to receive and send electronic messages to and from other agents. In response to such messages and in response to other conditions and events, the agents act to establish advertising bookings, schedule digital content for distribution to consumers including scheduling advertising along with entertainment content, identify digital content listed on a schedule but missing from the consumer's digital library, request schedules of digital content, distribute digital content across a communications network, decrypt and play or display the digital entertainment and advertising content, and maintain and manage digital libraries.

The improvements over prior art of the present invention are set forth in the following detailed description. For a better understanding of the inventions with its advantages and features, refer to the description and to the drawings.

BRIEF DESCRIPTION OF THE DRAWINGS

FIG. 2 identifies typical data elements in a master digital library.

FIG. 3 illustrates a typical set of events comprising a schedule.

Our detailed description explains the preferred embodiments of our invention, together with advantages and features, by way of example with reference to the referenced drawings.

DETAILED DESCRIPTION OF THE INVENTION

The invention pertains to an Internet-enabled means of distributing entertainment programming with embedded advertising in which the entertainment programming is customized according to consumers' stated preferences and the advertising is customized according to consumer demographics and also according to consumers' stated preferences. The invention pertains to a plurality of software agents executing on computer hosts. The agents are systems of software each of which is adapted to exchange across an electronic communications network electronic messages with other agents. In response to user requests and other events, the agents are capable of performing tasks as described below.

Figure 1:
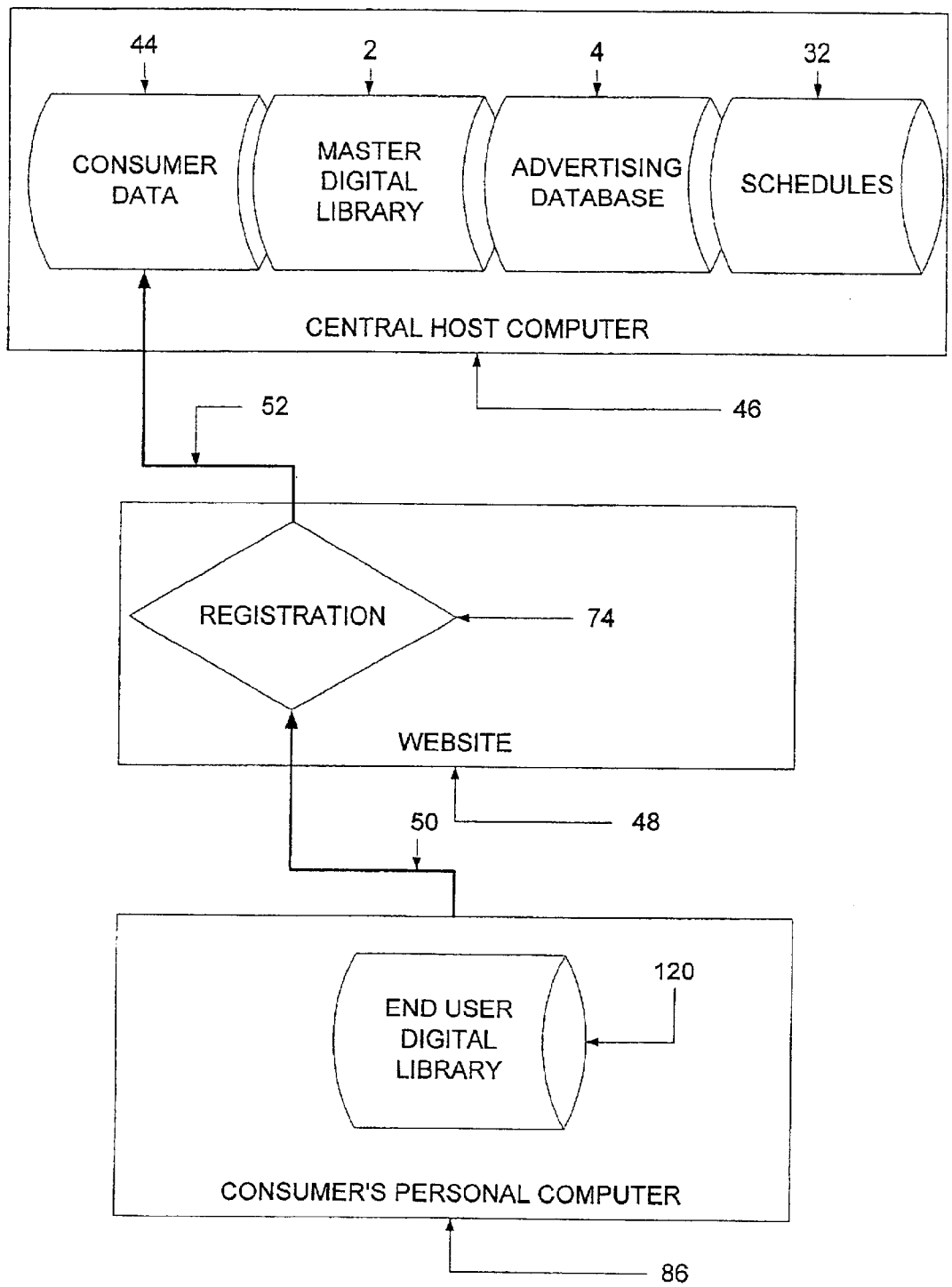
FIG. 1 illustrates the principal data stores of the invention.

The digital content of entertainment programming is embodied in encrypted, digital files stored in MPEG format. Means for storing the digital content is provided, as shown in FIG. 1, through a master digital library (2) on a central host computer (46) and in end user digital libraries (120) on consumers' personal computers (86). The digital files containing entertainment programming are referred to as tracks. The embedded advertisements, referred to as ads, also are stored in encrypted, digital MPEG format in an ads database (4) on a central host computer (46). The end user digital libraries (120) include indexes of the personal digital content for each end user and characteristics for each element of the personal digital content. The end user digital libraries (120) and the master digital library (2) can store various versions of the same track of music, which versions can be selected from the group comprising (a) wav (uncompressed), (b) high bit rate MP3, and (c) low bit rate MP3. Information stored in the digital libraries can include music tracks, artist's name by music track, title of music track, time code for music track, intro for music track, outro for music track, genre of music track, custom end user selected information for music including gender of artist, tempo of music track, era of music track, and number of beats per minute per music track. Information stored in the digital libraries can comprise data selected from the group comprising: digital music files, digital movie files, digital photos, digital message storage and other digital content.

Figure 9:
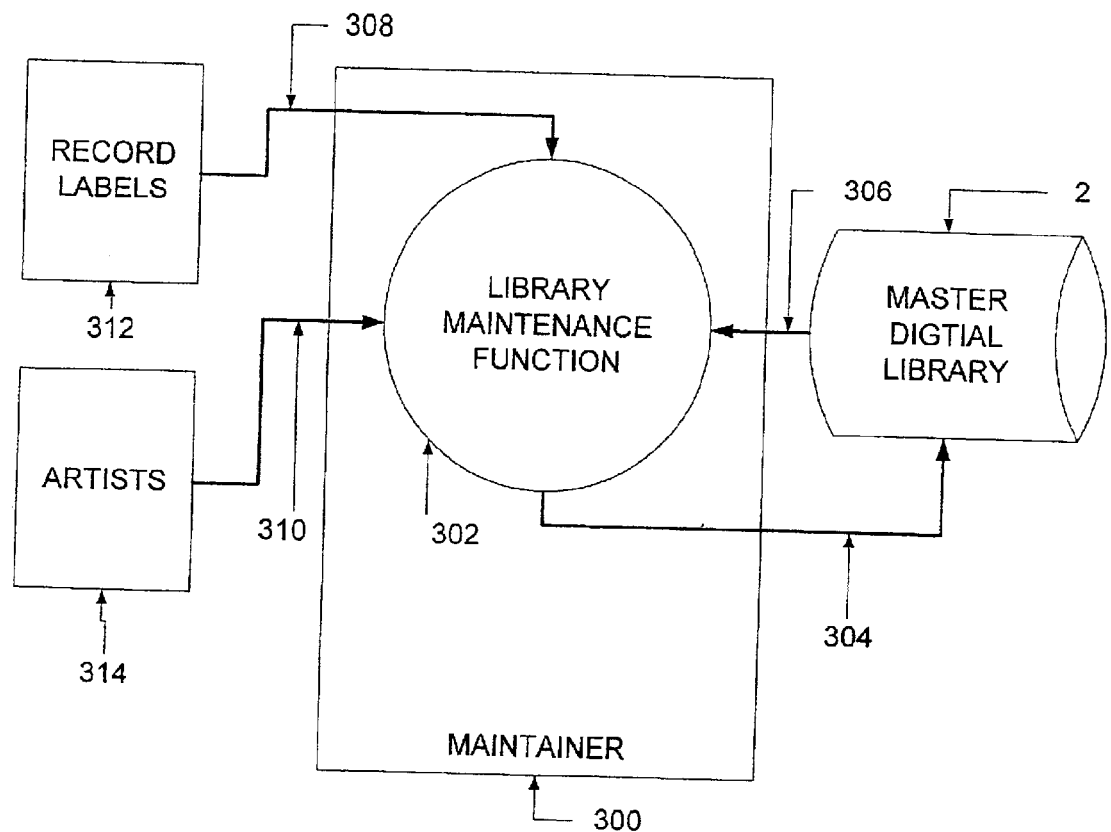
FIG. 9 illustrates maintenance of master digital libraries.

As part of the invention, in a preferred embodiment, at least one agent adapted to maintain and manage the digital library can be implemented as shown in FIG. 9 through an agent called a maintainer (300). Representatives of record labels (312) and artists (314) having works of entertainment stored as tracks in the master digital library (2) can access (308, 310) library maintenance functions (302) comprising the maintainer (300) for purposes of adding (304) or deleting (306) tracks from the master digital library (2). The library maintenance function (302) can comprise at least indexing, key word searching, classification parameters, and compression of digital data.

Figure 4:
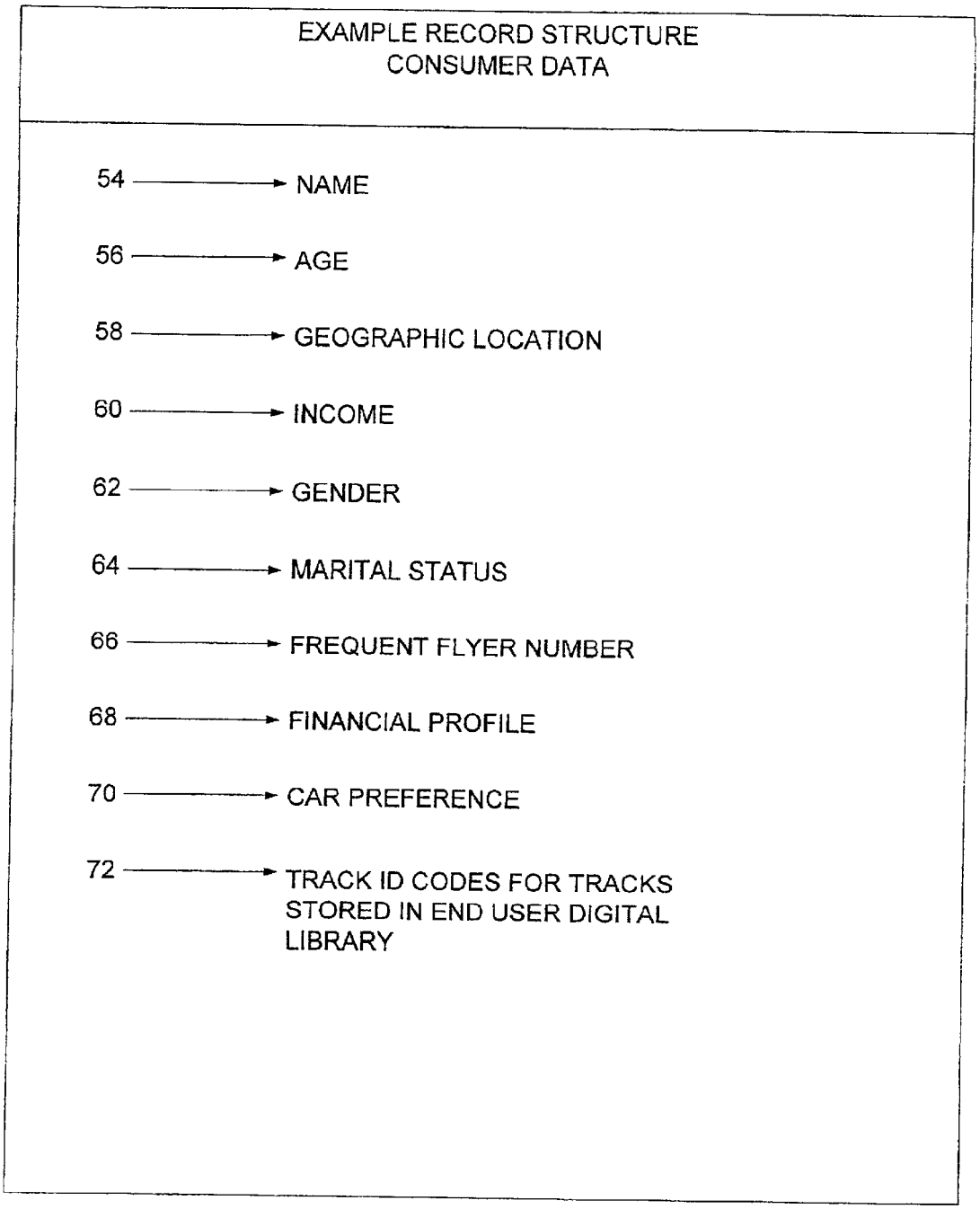
FIG. 4 identifies typical data elements in consumer data.

As shown in FIG. 1, also stored on the central host computer (46) for use in advertising is consumer data (44) for each consumer registered to use the invention. The store of consumer data (44) comprises a database comprising information on every end user. The principal operational interface between the consumer and the invention is an Internet website (48) through which consumers' personal computers (86) are connected to a central host computer (46). Each consumer wishing to use the invention as a source of personal entertainment programming registers (74) by using the consumer's personal computer (86) to access the website (48) and submit (50) pertinent identifying information, demographic information, and personal preference information, all of which together is stored (52) as consumer data (44) on the central host computer (46). Examples of typical elements of consumer data, as shown on FIG. 4, include name (54), age (56), geographic location (58), income (60), gender (62), marital status (64), frequent flyer numbers (66), additional financial profile data (68),  automobile preference (70), and any other useful information. The consumer data (44) will typically include also a listing of all track identification codes (72) for tracks stored in end user digital libraries (120).

As shown in FIG. 2, also stored in the master digital library (2) and in end user digital libraries (120) is attribute information for each track and ad, including for example, the artist's name (6), song title (8), album title (10), genre (12), song length (14), file format (16), bit rate (18), fade-in point (20), fade-out point (22), track identification code (24), track location (26), the encryption key (28) for the track or ad, and a URL (30) pointing to another website where a consumer can learn more about an ad or track. Header information, a subset of the attribute information, typically travels with the track or ad when the track or ad is distributed to consumers. Header information typically includes information appropriate for display while the ad or track is playing, including for example, the artist's name (6), the song title (8), the album title (10), and a URL (30) pointing to another pertinent website. Header information is optionally encrypted.

Also shown in FIG. 1 as stored on the central host computer (46) are schedules (6), digital computer database records containing lists of events to be effected as sequential elements of entertainment programming. Examples of events comprising schedules, as shown in FIG. 3, are tracks (102, 104, 106, 108, 110, 112), ads (36, 37, 39), local insert breaks (38), recorded announcements (40), and external events (42). Local insert breaks, recorded announcements, and external events are optional elements that can be inserted into schedules by users or consumers. Schedules, tracks, and ads for play by consumers preferably are stored on the consumers' personal computers.

Figure 5:
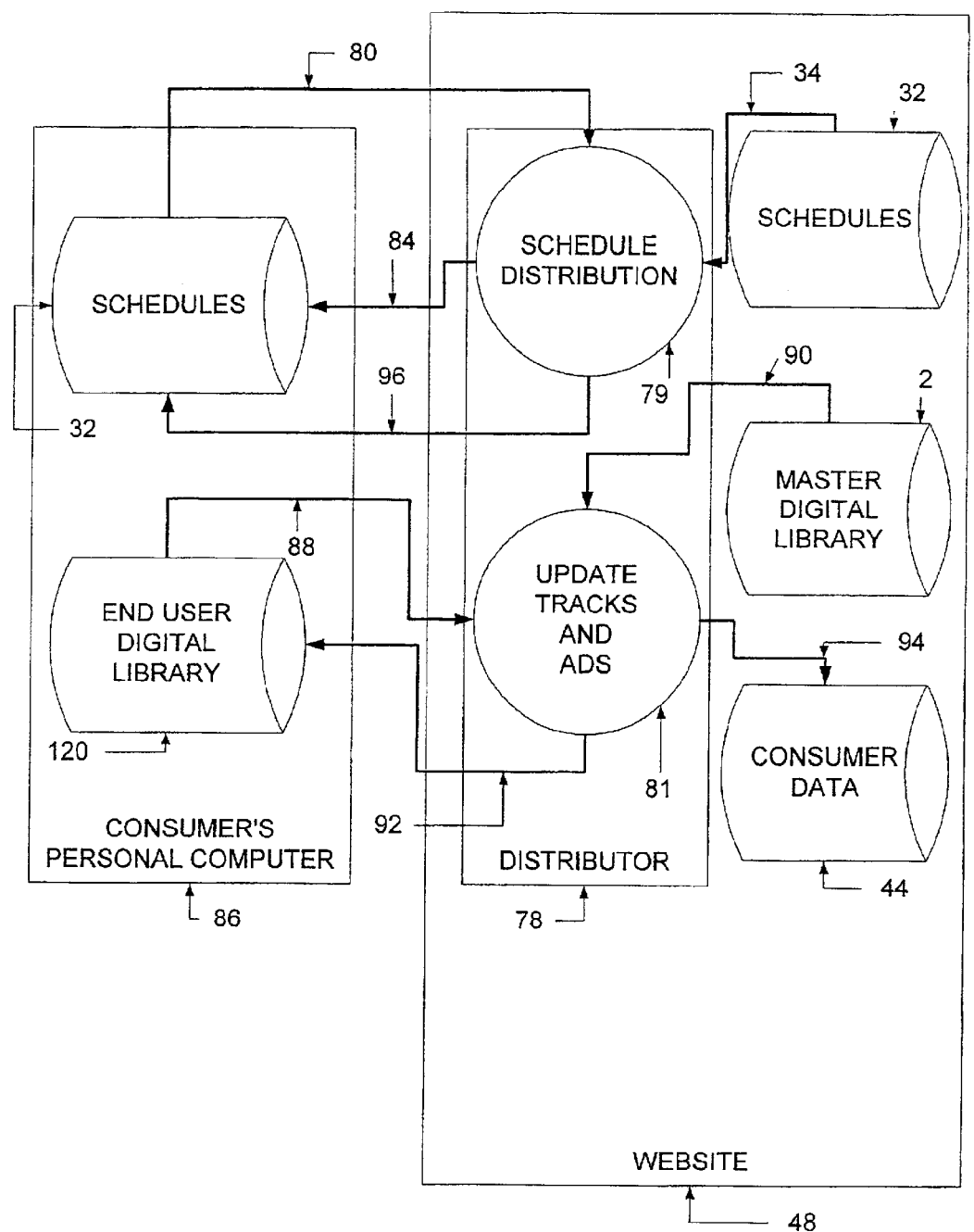
FIG. 5 illustrates the distribution of schedules.

As part of the invention, in a preferred embodiment, means for comparing the schedule of digital content with an end user's digital library, means for identifying digital content listed on the schedule but missing from the end user's digital library, and means for communicating with said master digital library to obtain the digital content missing from the end user's digital library can be implemented as shown in FIG. 5 through a software agent called a distributor (78) that operates every time the consumer logs onto the website (48) using a personal computer (86). Distributors comprise at least one agent adapted to perform distribution of digital content. Distributors also comprise at least one agent to request schedules of digital content The distributor can effect schedule distribution (79) by identifying schedules ordered (80) by the consumer and delivers (34) the schedules (32) via the Internet (84) to the consumer's personal computer (86). If the schedules (32) were already installed on the consumer's personal computer (86), the distributor updates them (96).

The distributor can update tracks and ads (81) by reading (88) from an end user digital library (120) the identifying information for the tracks and ads required to fulfill the installed schedules (32) to determine whether the required tracks and sectors are installed on the consumer's personal computer (86). If the required tracks are not installed on the consumer's personal computer (86), the distributor retrieves (90) required tracks and ads from the master digital library (2) and delivers them (92) via the Internet to the end user digital library (120) on the consumer's personal computer (86). The distributor then updates (94) the consumer data (44) so that the current listing in the consumer data (44) of tracks stored on the consumer's personal computer (86) is accurate. At play time, therefore, all tracks and ads needed to execute a schedule, as well as the updated form of the schedule itself, are typically available on the consumer's personal computer (86), and an accurate list of the tracks stored on the consumer's personal computer (86) is included within the centrally-stored consumer data (44).

Figure 6:
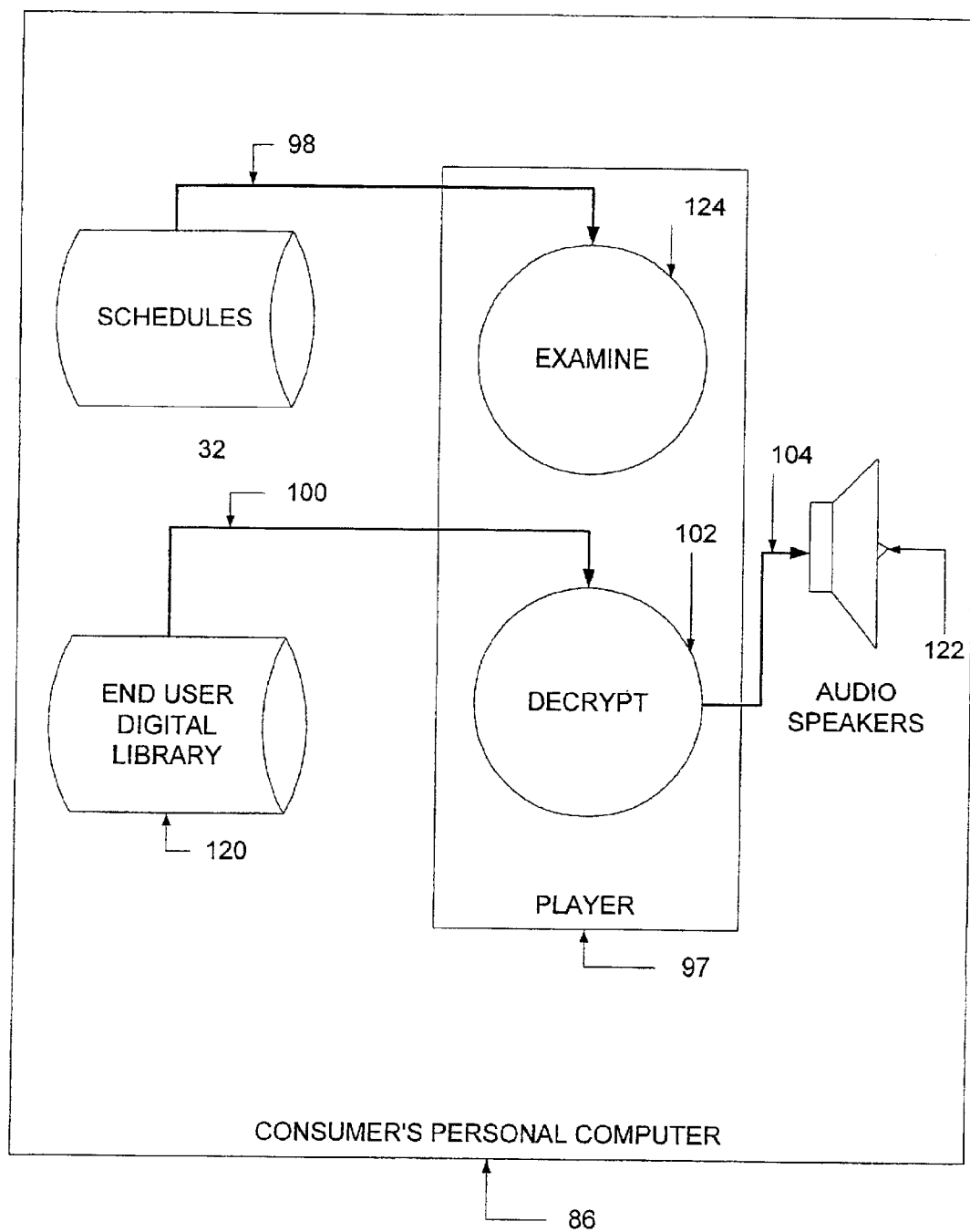
FIG. 6 illustrates the playing of schedules.

As part of the invention, in a preferred embodiment, means for actually playing entertainment tracks and running ads, as shown in FIG. 6, can be implemented as shown in FIG. 6 through a software agent called a player (97). Schedules can be executed by players (97). A player (97) reads (98) schedules (32) selected for play and examines them (124) to determine that all tracks and ads needed for play are present in the end user digital library (120) on the consumer's personal computer (86) along with the any necessary encryption codes in the header information for each track and ad. That is, the player checks that none of the digital information needed for play had been inadvertently deleted from the consumers' personal computer since the last time the player was invoked. The player then reads (100), decrypts (102), and plays (104), through, for example, audio speakers (122), in sequence, events identified in a selected schedule (32). The player can permit consumers to repeat tracks. The player can permit consumers to skip tracks, but consumers typically will not be permitted to skip ads.

Figure 7:
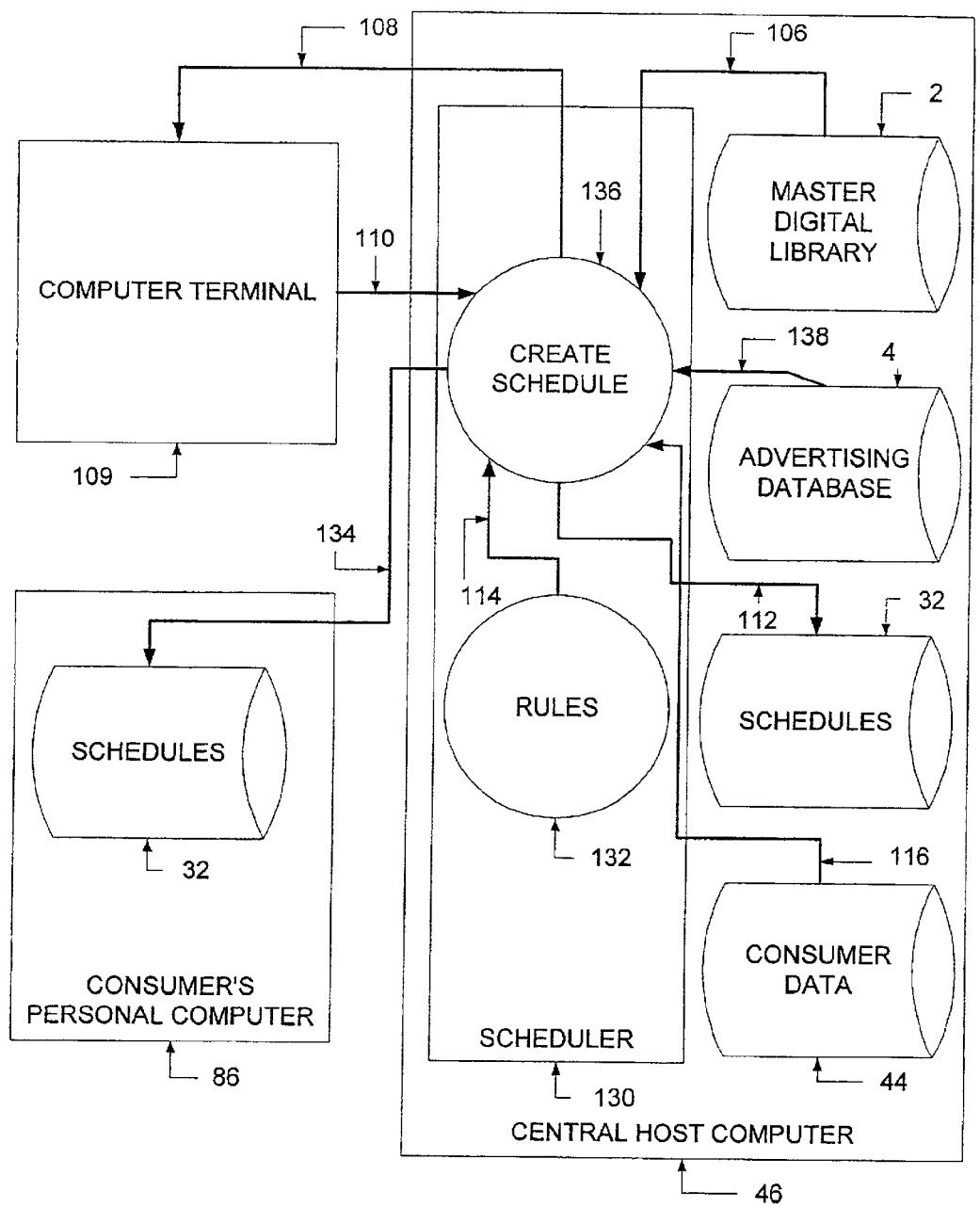
FIG. 7 illustrates the creation of schedules.

As part of the invention, in a preferred embodiment, means for creating or obtaining a schedule of digital content and means for inserting ads into the digital content to be provided from a master digital library can be implemented as shown in FIG. 7 through software agents called schedulers (130). Schedulers (130) comprise at least one agent adapted to schedule digital content. Schedulers can create (136) schedules (32). A scheduler (130) reads (106) from a master digital library (120) and displays (108) on a computer terminal (109) lists of tracks available for inclusion in a schedule. A scheduler (130) allows users to select (110) from the available tracks those to be included, and their sequence of inclusion, in a schedule (32). Schedules (32) so formed typically can be stored (112) on a central host computer (46) or downloaded (134) to a consumer's personal computer (86). Schedules (32) can be reserved as standard formats. For example, users can form one or more standard formats containing blues programming, or adult rock and roll, or quiet jazz, and make such standard-format schedules, complete with ads inserted, available for distribution to consumers. The scheduler (130) is programmed to utilize (114) in creating schedules (32) legal and industry rules (132), including for example, the artist and album separation rules of the RIAA, ASCAP, and BMI. Schedulers (130) can be adapted also to schedule tracks, ads, and events comprising other digital content, by reference to rules regarding the number of tracks to be inserted between tracks by the same artist, rules regarding the tempo usable by tracks in series, and rules regarding the genre of music by track. In creating (136) schedules (32), the scheduler (130) inserts ads (138) selected from the ads database (4) according to demographic and personal-preference criteria retrieved (116) from the consumer data (44). Schedulers (130) can comprise administrative agents offering preset schedules comprising digital content and advertisements. Schedulers (130) can be adapted to comprise branded channels offering at least one preset schedule including ads of defined duration and specific frequency of occurrence wherein the schedule effects a defined theme.

Consumers can obtain for distribution through the principal interface website (48) a variety of standard-format schedules, or alternatively, consumers can utilize a scheduler (130) to create their own customized schedules (32). When a consumer uses a scheduler (130) to create (136) customized schedules (32), the scheduler (130) can retrieve ads for insertion in the schedule (138) selected from the ads database (4) according to demographic and personal-preference criteria retrieved (116) from the consumer data (44) for each consumer who creates such customized schedules.

Figure 8:
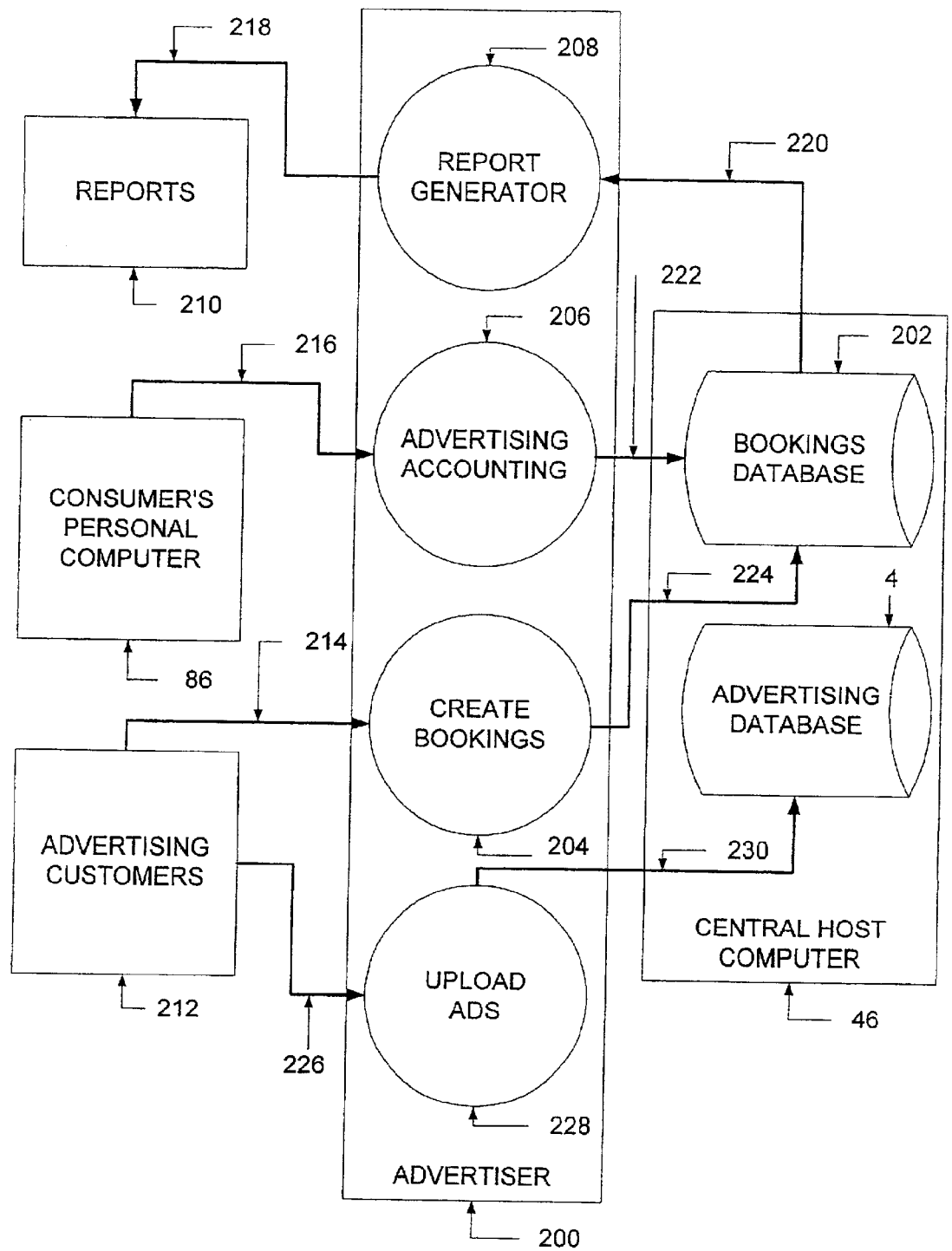
FIG. 8 illustrates the administration of advertising.

The invention's means for booking and distributing advertising can be implemented in a preferred embodiment through a software agent called an advertiser (200), as shown in FIG. 8. Advertising customers (212) can submit requests (214) to create bookings (204) that are then stored (224) in a bookings database (202) on a central host computer (46). Bookings stored in the bookings database (202) represent purchases by advertising customers (212) of the right to have ads (4) inserted, with certain frequencies and for certain periods, into schedules ordered by consumers having particular demographics and stated personal preferences as described above and depicted in FIG. 7. Advertising customers (212) can submit (226) ads (4) for uploading (228) and storage (230) in an ads database (4) on a central host computer (46). Ads can be distributed for use in advertising as described above and shown on FIG. 7.

After ads are used in advertising, an advertising accounting function (206) within the advertiser (200) can read accounting information (216) from consumers' personal computers (86), which accounting information can include for example when and how many times particular ads were run, and store that accounting information (222) in the bookings database (202). A report generating function (208) within the advertiser (200) can read the accounting information (220) from the bookings database and print (218) reports (210), which reports can include, for example, as-run logs of particular advertising listing every ad run, reconciliation reports comparing bookings to actual ad runs, totals of ads run, ads missed totals, current account information, when and where particular ads were run, and so on Alternatives The present invention is also considered to include the following alternative embodiments:

Although track file formats have been described as typically MPEG, in fact, track files can be provided and used in the present invention in any useful format, included newer, more efficient formats that become available in the future.

Although the player has been described as typically implemented on a personal computer, in fact, the player, along with related elements of the invention as needed to distribute and perform digital content tracks and ads, can be implemented on any Internet-enabled appliance, including for example, set-top boxes, satellite receivers, palm computer such as Palm Pilots and their future generation, home audio systems, home entertainment systems, video recorders, notebook computers, television sets, DVD players, portable players such the Rio by Diamond, and automobile audio systems.

Although the invention has been described using preferentially a player to decrypt and play tracks and ads stored on consumers' personal computers, in fact, the invention includes as an alternative, a software agent referred to as "the streamer" that executes a schedule stored on the central host computer by streaming the tracks and ads comprising the schedule through a known streaming technology, such as RealNetworks G2, Shoutcast, or Netshow, for real-time play on consumers' personal computers.

Although the invention has been described using the Internet preferentially for data communications among elements of the invention, data communications can alternatively be implemented by any data communications network, including for example, intranets, private networks, local area networks, personal digital communications interfaces, any network supporting standard data communications protocols, and combinations of these.

Although the inventions has been described as preferentially incorporating advertising, in fact the inventions includes the alternative of providing to consumers entertainment programming without advertising. Consumers can pay a fee to subscribe to programming without advertising. The subscription fees can provide an alternative to advertising revenue as a source of funding for royalty payments to record labels and artists for use of their music and other entertainment content. All the counting, accounting, and reporting functions of the invention, showing frequency and quantity of performances, can remain in place with this alternative, assuring that artists and labels are paid in the same fashion as when the entertainment content is scheduled, distributed and performed with advertising.

Although the invention has been described as allowing consumers to create and store schedules by use of a scheduler on a central host computer accessed through a website, in fact, consumers can also create schedules for storage on consumers' personal computers by use of schedulers installed on consumers' personal computers.

The invention can further comprises interfaces to additional sources of digital content capable of inclusion in schedules including for example instant messaging objects such as ICQ, Yahoo Pager and AOL Messenger.

While we have described our preferred embodiments of our invention, along with several alternatives, it will be understood that those skilled in the art, both now and in the future, may make various improvements and enhancements which fall within the scope of the claims which follow. These claims should be construed to maintain the proper protection for the invention first disclosed.

What is claimed is:

1. A method for creation of a personal audio broadcast comprising the steps of:

(a) selecting a schedule of music tracks for play selected from the group comprising: an end user created schedule, a preset schedule from a source of schedules, and schedules offered on a branded channel;

(b) comparing the music tracks of the selected schedule to music tracks stored in an end users digital library;

(c) identifying the music tracks of the selected schedule which are not in the end users digital library and obtaining those music tracks from a reference digital music library which provides the music tracks and ads attached to each selected music track, and compressing the located music tracks with attached ads;

(d) transmitting the compressed music tracks with ads to the end user without further compression or decompression;

(e) storing the compressed music tracks with ads at the end user's digital library;

(f) decompressing the compressed music tracks with ads; and (g) utilizing the decompressed music tracks with ads without further compression or decompression in a time variable manner responsive to an end user initiated command.

* * * * *